April 16, 1935. H. FREEMAN Re. 19,532
PROCESS OF AND APPARATUS FOR OXIDIZING METAL SULPHIDES AND MAKING SULPHUR DIOXIDE
Original Filed Jan. 17, 1929
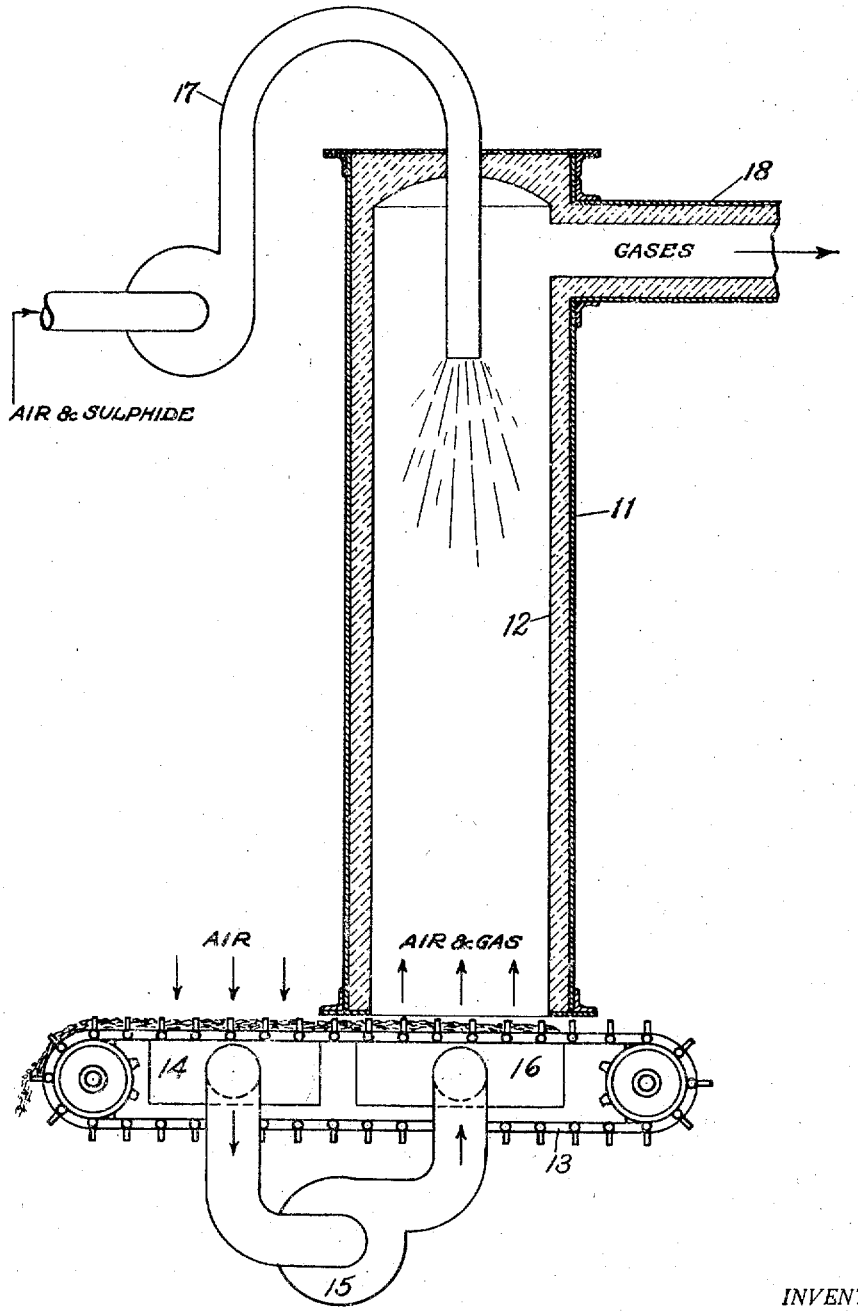
INVENTOR.
HORACE FREEMAN
BY Ward, Crosby & Mead
ATTORNEYS.

Reissued Apr. 16, 1935

Re. 19,532

UNITED STATES PATENT OFFICE 19,532

PROCESS OF AND APPARATUS FOR OXIDIZING METAL SULPHIDES AND MAKING SULPHUR DIOXIDE

Horace Freeman, Three Rivers, Quebec, Canada, assignor to Nichols Engineering & Research Corporation of Canada, Limited Original No. 1,812,397, dated June 30, 1931, Serial No. 333,222, January 17, 1929. Application for reissue June 23, 1933, Serial No. 677,324

32 Claims. (Cl. 75—60)

This invention relates to process of and apparatus for oxidizing metal sulphides, and the principal objects of the invention are the production of sulphur dioxide of sufficient purity for the manufacture of sulphurous and sulphuric acids and, if desired, the production of a dustless, solid, sintered residue.

A further object of the invention is the provision of a novel process of oxidation and a novel type of furnace adaptable to a variety of uses.

An important feature of the invention is that the rate of air input to the combustion chamber is so proportioned to the dimensions of the latter that the sulphide particles are kept in suspension in the uprising air current for sufficient length of time to substantially complete their combustion before reaching the bottom of the furnace where the formed oxide is removed. Sulphur which may remain in the particles may be removed from the sintered residue by passing air through it.

Another feature of the invention is that the sulphide particles are rapidly heated to a state of incipient fusion and, in this state, are inflated by evolution of gas therefrom to provide a very large surface for oxidation and may eventually be collected in the form of a highly porous solid sintered mass.

A further feature of the invention is that the oxidation is accomplished at high temperature and without use of fuel other than the sulphide itself and that an excess of heat is available for recovery and utilization.

In carrying out the invention, dry finely divided metal sulphide (for example, such as will pass through a 50 mesh screen) is injected, by means of a current of air insufficient in amount for complete combustion of the sulphide into a combustion chamber heated to a temperature at which the sulphide will ignite in the air. The rate of sulphide feed is in such relation to the dimensions of the combustion chamber that the velocity of the gases resulting from combustion of the sulphide will be about five to ten feet per second. The burning sulphide meets a countercurrent of air or gas mixture containing free oxygen in amount sufficient to complete the oxidation of the sulphide. Owing to the low velocity of the gaseous combustion products, the burning sulphide will fall but is impeded by the countercurrent of air sufficiently to allow substantially compete combustion before the particles reach the bottom of the chamber, where they are collected in running water or collected on a travelling grate in the form of a sintered mass and are transported out of the combustion chamber by the grate. When a travelling grate is used, the air necessary to complete oxidation is first drawn or blown through the sintered mass after it is removed from the furnace, thus serving the triple purpose of burning any sulphur which has not been consumed in the furnace, cooling the sintered mass and preheating the air. This preheated air carrying a small proportion of sulphur dioxide is then passed into the combustion chamber through the grate. The finely divided sulphide exposed to high temperature burns quickly and with such evolution of heat that the escaping gaseous products of combustion may be advantageously passed through a steam boiler both to cool the gas and to recover the heat in the steam which will be generated. The high temperature ensures freedom from acid gases which would corrode a boiler. Owing to the high temperature prevailing in the combustion chamber, oxidation of the finely divided sulphide commences almost instantly on entrance into the combustion chamber and the sulphide loses some of its sulphur content, thereby becoming more readily fusible. The small particles of sulphide in a state of incipient fusion are apparently inflated, by the evolution of gases therefrom, into small hollow globular bodies or bubbles, which settle slowly through the rising air and gas and collect on the grate to form a solid but very porous sintered mass through which the incoming air flows without difficulty.

This process operates with greatest success upon those sulphides which yield oxides with high melting temperatures, notably those of iron and zinc, but with suitable regulation of the rates of sulphide and air feeds, the process may be applied also to those sulphides which yield oxides with lower melting temperatures, such as the copper and lead sulphides.

A particularly important application of the invention lies in its use for the production, from iron pyrites, of sulphur dioxide to be used in the manufacture of wood pulp.

A great advantage of the process is that it is applicable to the treatment of flotation concentrates or other finely divided ores which are admirably suited to the process without previous treatment as is required in other methods of roasting.

The form of apparatus now preferred is shown more or less diagrammatically in the accompanying drawing, but it will be understood that the invention is not confined to any or all of the details of the apparatus illustrated, as numerous changes may be made.

Referring more particularly to the drawing, 11 designates a gas-tight furnace shell, preferably of metal, having a refractory lining 12. At the bottom of the furnace is a travelling grate 13, shown as of the endless belt type, but which may be of rotary or any other suitable type. Close to the furnace a suction box 14 is provided beneath the outcoming grate and is connected to a blower 15, which discharges into an air chamber 16 beneath the furnace and below the grate. Air and finely divided dry sulphide are passed downwardly into the top of the furnace through a conduit 17. A gas outlet 18 is provided at the top of the furnace.

The operation of the process and apparatus, broadly speaking, is that the finely divided material is fed into the furnace and forms a flame whence it falls onto the travelling grate, where it is further burned with preheated air passed upwardly through the grate. The travelling grate removes the solid combustion residue from the furnace and the air necessary for combustion is preheated by being drawn through the grate and hot solid combustion residue thereon at a point outside the furnace. Material which has escaped unburned from the furnace is burned on the grate outside the furnace and the heat and gases of combustion are introduced into the furnace with the air. The solid residue is also cooled. The process generally may also extend to introducing with the ore, air insufficient for its complete combustion.

In greater detail, the operation of the process and of the apparatus depicted is as follows;—Dry, finely divided metal sulphide, such as a flotation concentrate or finely crushed iron pyrites, is injected with less air than required for its complete oxidation (termed primary air) downwardly into the highly heated furnace slowly, while the sulphide ignites and falls burning, onto the travelling grate 13. While falling, the particles are heated to a state of incipient fusion and, in this state, are inflated by the gas evolving from them and present very large surface for oxidation, relative to the volume of the particles.

The partially oxidized sulphide particles in the sticky state of incipient fusion collect on the grate in the form of an extremely porous or spongy cake, which is quite pervious to the air (termed secondary air) passing up through the grate. The greater part of the oxidation occurs before the sulphide reaches the grate and the sintered mass leaving the furnace is 90% to 99% oxidized. The blower 15 draws air (termed tertiary air) through the sintered mass on the grate immediately after it leaves the furnace. The relatively large amount of air substantially completes the oxidation, recovers a large proportion of the heat of the sinter cake and preheats the air entering the furnace. The sulphur content of the sinter cake may thus be reduced as low as .01%. The preheated entering air (carrying a small percentage of sulphur dioxide) oxidizes the sulphide on the grate as previously stated and then passes upwardly through the furnace, oxidizing the falling particles of sulphide and reacting with any vaporous elemental sulphur which has distilled out of the sulphide on its initial exposure to the furnace heat. With properly adjusted air supplies, the gas escaping from the furnace is substantially all sulphur dioxide and nitrogen.

Owing to treating the sulphides in finely divided state and at high temperature, the oxidation is very rapid and there is little time for loss of heat, so that considerable of the heat of combustion may be recovered, which may be done by passing the hot gases through a steam boiler. This also rapidly cools the gas.

It will be seen that the counter current air may pass once or twice through the hot pervious sinter cake and, obviously, the number of such passages may be increased.

While the only oxidizing medium mentioned is air, it will be obvious that any gas mixture which contains the requisite free oxygen and which will not react undesirably with the sulphide or formed oxide may be substituted for air. In the following claims, the term "air" is to be construed as including such gas mixtures.

The preferred temperature of operation will vary according to the sulphide treated and may be stated to lie above the ignition temperature of the sulphide and below the temperature at which the material collecting on the grate is so far fused as to be difficultly pervious to the entering air.

While the grate preferably travels continuously at low lineal speed, it may have an integrating movement.

While the sulphide introducing current of gas has been stated to be air, it will be understood that a nonoxidizing gas may be substituted and all the oxidizing effect obtained from a countercurrent of oxidizing gas, or, alternatively, all the oxidizing gas may be introduced with the sulphide and the countercurrent of gas may be nonoxidizing and serve merely to maintain the particles in suspension in the oxidizing gas until oxidation is as complete as desired; or, further alternatively, both of the countercurrents of gas may be non-oxidizing and serve to maintain the sulphide particles in suspension and exposed to an oxidizing gas introduced separately from the two countercurrent streams.

Having thus described my invention, what I claim is:—

1. A process of oxidizing metal sulphides which comprises introducing the sulphide in finely divided form into a preheated combustion chamber with an amount of air insufficient for complete oxidation, and introducing a countercurrent of air in amount sufficient to substantially complete the oxidation.

2. A process according to claim 1, in which the combustion chamber is maintained at such temperature that the sulphide particles are semi-fused and inflated by evolution of gas therefrom and collect in a spongy solid mass readily pervious to the passage of air.

3. A process according to claim 1, in which the sulphide is introduced downwardly into the top of the combustion chamber.

4. A process according to claim 1, in which the sulphide in a state of incipient fusion and inflated by evolution of gas therefrom is collected in a spongy mass through which the countercurrent of air is introduced into the combustion chamber.

5. A process according to claim 1, in which the countercurrent of air is preheated and oxidation of the sulphide completed by passing the air in contact with the substantially completely oxidized sulphide at a point outside the combustion chamber.

6. A process of oxidizing metal sulphides, which comprises introducing the sulphide in finely divided state with an amount of air insufficient for complete oxidation of the sulphide into a combustion chamber heated to a temperature above the ignition temperature of the sulphide and below the temperature at which the sulphide would fuse to a mass impervious to air, collecting the partially oxidized sulphide in a layer pervious to air, passing a secondary supply of air, in amount sufficient to substantially complete oxidation of the sulphide, through the pervious layer of sulphide into the combustion chamber and countercurrent to the entering sulphide, removing substantially completely oxidized sulphide from the combustion chamber and completing the oxidation of the sulphide, cooling the same, and preheating the secondary air supply by passing the air through the withdrawn sulphide prior to introducing said air into the combustion chamber.

7. A process according to claim 1, in which the combustion chamber is maintained at a temperature between the ignition temperature of the sulphide and the temperature at which the partially oxidized sulphide would fuse and collect in a mass impervious to air.

8. A process of oxidizing metal sulphides, which comprises passing a relatively large proportion of air downwardly through a hot spongy layer of nearly completely oxidized sulphide, passing the resulting heated mixture of gas and air upwardly through a hot pervious layer of less completely oxidized sulphide into a countercurrent of finely divided substantially unoxidized sulphide and air entering a combustion chamber heated above the ignition temperature of the sulphide.

9. A process according to claim 1, in which the partially oxidized sulphide is collected in a pervious layer and the countercurrent air passed a plurality of times through said layer prior to entry of said air into the combustion chamber.

10. A process according to claim 1, in which substantially completely oxidized sulphide is continuously removed, in a pervious layer, from the combustion chamber and the countercurrent air introduced through such moving layer into the combustion chamber.

11. A process according to claim 1, in which partially oxidized sulphide is collected in a pervious layer and the countercurrent air passed a plurality of times through such layer, in suchwise that the air contacts successively with progressively hotter and progressively less oxidized portions of the layer.

12. A process of oxidizing metal sulphides and producing sulphur dioxide therefrom, which comprises introducing the sulphides in finely divided form into the upper end of a heated combustion zone through which the sulphides will gravitate substantially vertically downward, and introducing into the lower end of said zone in vertically upward direction a current of air for combustion of the sulphides and so regulating the amount and velocity of the air relatively to the introduction of sulphide and the dimensions of the combustion zone that the gravitation of the sulphide particles is retarded substantially without lateral deflection of the particles from their downward path until combustion is substantially complete and the particles attain to a condition of incipient fusion such that they will adhere to one another.

13. A process of oxidizing metal sulphides and producing sulphur dioxide therefrom which comprises passing a current of air and a stream of the sulphide in finely divided state in opposite directions and in contact with one another, and heating the sulphide particles while moving countercurrent to the air at least to the ignition temperature of the particles, the amount and velocity of the air being such as to maintain the particles in suspension until they attain to a sticky state of incipient fusion.

14. A process of oxidizing metal sulphides and producing sulphur dioxide therefrom, which comprises passing the sulphides in finely divided state downwardly through a current of air moving upwardly at such velocity as will retard the natural downward movement of the sulphide particles due to gravitation, for such length of time as will ensure substantially complete oxidation of the sulphide, and heating the sulphide while passing countercurrent to the air to at least the temperature of ignition of the sulphide, the amount and velocity of the air being such as to maintain the particles in suspension until they attain to a sticky state of incipient fusion.

15. A process of oxidizing metal sulphides and producing sulphur dioxide therefrom, which comprises creating in a confined space a flame of finely divided metal sulphide with air insufficient in amount for complete combustion of the sulphide, introducing into said space a secondary supply of air in amount sufficient to complete combustion of the sulphide and directing the sulphide and primary air supply countercurrent to the secondary air supply.

16. A process of oxidizing metal sulphides and producing sulphur dioxide therefrom, which comprises creating in a confined space a flame of finely divided metal sulphide with air insufficient in amount for complete combustion of the sulphide, introducing into said space a secondary supply of air in amount sufficient to complete combustion of the sulphide, directing the sulphide and primary air supply countercurrent to the secondary air supply, maintaining the temperature such that the sulphide will be heated to a state of incipient fusion, collecting the sulphides while in such state of incipient fusion in a layer pervious to air, and causing the secondary air in process of introduction into said space to pass through said pervious layer of sulphide.

17. A process of oxidizing metal sulphides, which comprises introducing the sulphides in finely divided form into an oxidizing atmosphere in a combustion zone heated to at least the ignition temperature of the sulphides, and maintaining the sulphides in suspension in said atmosphere until substantially completely oxidized and heated to a sticky state of incipient fusion by establishing countercurrents of gas in said combustion zone in such direction and at such velocity that gravitation of the sulphide particles is retarded substantially without lateral deflection of the particles from their normal downward path due to the action of gravity.

18. A process of oxidizing metal sulphides, which comprises passing a current of gas and a stream of the sulphide in finely divided state in opposite directions in an oxidizing atmosphere whereby the passage of the particles is retarded and the particles maintained in contact with the oxidizing atmosphere a sufficient length of time for substantially complete combustion and the attainment of a sticky state of incipient fusion, and heating the sulphide in contact with the oxidizing atmosphere to at least the ignition temperature of the sulphide.

19. Apparatus for the oxidation of metal sulphides, which comprises a combustion chamber, a travelling grate at the bottom of said chamber, a suction box below the grate outside the combustion chamber, a blower connected to the suction box and to the combustion chamber below the grate to draw air through the grate and material thereon into the suction box and to discharge the air through the grate and material thereon at another point into the combustion chamber, and means to feed sulphide into the combustion chamber.

20. Apparatus for oxidizing metal sulphides comprising a combustion chamber, means to feed finely divided sulphide and air into said chamber, means to collect partly oxidized sulphide in a layer and to remove the same from the chamber, and means to pass air through the layer of sulphide.

21. A furnace comprising a combustion chamber, a travelling grate arranged to support fuel in the furnace and to withdraw fuel residue or partly burned fuel from the furnace, and means to pass air a plurality of times through fuel on the grate and into the combustion chamber, the means being such that the first passage of air is through fuel withdrawn from the furnace.

22. A process of oxidizing metal sulphides and producing sulphur dioxide therefrom, which comprises introducing the sulphides in finely divided form together with insufficient air for complete combustion into the upper end of a heated combustion zone through which the sulphides will gravitate substantially vertically downward, and introducing into the lower end of said zone in vertically upward direction a current of air sufficient to complete combustion of the sulphides, and so regulating the amount and velocity of the air relatively to the introduction of sulphide and the dimensions of the combustion zone that the gravitation of the sulphide particles is retarded substantially without lateral deflection of the particles from their downward path until combustion is substantially complete.

23. A process of oxidizing metal sulphides, which comprises introducing the sulphide in finely divided form into an oxidizing atmosphere in a combustion chamber heated to at least the ignition temperature of the sulphide, collecting the solid products of combustion at the bottom of the chamber, and passing a stream of gas through the collected solid products of combustion into the combustion chamber and countercurrent to the sulphide, the amount and velocity of the gas being such as to maintain the sulphide in suspension in the oxidizing atmosphere until substantially completely oxidized.

24. A process of oxidizing metal sulphides which comprises introducing the sulphide in finely divided form into an oxidizing atmosphere in a combustion chamber heated to at least the ignition temperature of the sulphide, collecting the solid products of combustion at the bottom of the chamber and passing a stream of air through the solid products of combustion into the combustion chamber and countercurrent to the sulphide, whereby unburned sulphide in said solid product is oxidized and the air preheated, the amount and velocity of the air being such as to maintain the sulphide in suspension in the oxidizing atmosphere until substantially completely oxidized.

25. A process of oxidizing metal sulphides, which comprises introducing finely divided metal sulphide and a stream of gas into a combustion chamber, passing a second stream of gas countercurrent to said first named gas stream, and causing said metal sulphide, while in said combustion chamber, to react with air sufficient in quantity to effect substantially complete oxidation thereof.

26. A process of oxidizing metal sulphides, which comprises introducing finely divided metal sulphide and a stream of gas into a combustion chamber, passing a second stream of gas countercurrent to said first named gas stream, and causing said metal sulphide, as it passes through said combustion chamber, to react with air sufficient in quantity to effect substantially complete oxidation thereof.

27. A process of oxidizing metal sulphides which comprises introducing the sulphide in finely divided form into a preheated combustion chamber, introducing into said combustion chamber an amount of air insufficient for complete oxidation of the sulphide, and introducing a countercurrent of air in amount sufficient to substantially complete the oxidation.

28. A process of oxidizing metal sulphides and producing sulphur dioxide therefrom, which comprises introducing the sulphides in finely divided form into the upper end of a heated combustion zone through which the sulphides will gravitate substantially vertically downward, introducing into said combustion zone an amount of air insufficient to effect complete combustion of said sulphides, and introducing into the lower end of said zone in vertically upward direction a current of air sufficient to complete combustion of the sulphides, and so regulating the amount and velocity of the air relatively to the introduction of sulphide and the dimensions of the combustion zone that the gravitation of the sulphide particles is retarded substantially without lateral deflection of the particles from their downward path until combustion is substantially complete.

29. A process of oxidizing metal sulphides, which comprises producing an upwardly moving gaseous stream in a combustion chamber, passing finely divided metal sulphide, while entrained in a gaseous stream, into said gaseous stream for downward passage therethrough in subtantially a vertical direction only, causing said metal sulphide, while in said combustion chamber, to react with air sufficient in quantity to effect substantially complete oxidation thereof, and maintaining the temperature required for oxidation of said metal sulphide solely by the heat generated by combustion of the sulphur content thereof.

30. In the art of treating a metal sulphide in a combustion chamber in the presence of air sufficient to effect substantially complete oxidation thereof, the steps which consist in introducing finely divided metal sulphide into the top of a combustion chamber while entrained in a gaseous stream, passing a secondary stream of gas counter-current to the descending material, passing the sulphur dioxide from said combustion chamber at the top thereof, and separately removing the oxidized material from said combustion chamber.

31. In the art of treating a metal sulphide in a combustion chamber in the presence of air sufficient to effect substantially complete oxidation thereof, the steps which consist in introducing finely divided metal sulphide into the top of a combustion chamber while entrained in a stream of gas, passing a second stream of gas counter-current to the descending material, elevating the temperature of the second stream of gas by heat produced in said combustion chamber, passing the sulphur dioxide from said combustion chamber at the top thereof, and separately removing the oxidized material from said combustion chamber.

32. Apparatus for flash roasting finely divided ore comprising a vertically elongated roasting chamber having side walls and roof, nozzle means at the midportion of said roof, means communicating with said nozzle for injecting finely divided ore with a stream of gaseous medium through said nozzle downwardly in said chamber, said chamber being provided with an opening at the bottom for permitting the cinder to fall therefrom, an opening at the top of said roasting chamber but spaced laterally substantially from the outlet of said nozzle for the dischrage of gases of combustion from the chamber, and means for introducing gaseous oxidizing medium at said opening at the bottom of the chamber and for causing the gases of combustion to be discharged from said opening at the top of the chamber.

HORACE FREEMAN.